Oct. 22, 1935.　　　R. W. BAILY　　　2,018,294
APPARATUS FOR ELIMINATING THE TRANSMISSION OF VIBRATIONS
Original Filed Nov. 23, 1931　　2 Sheets-Sheet 1
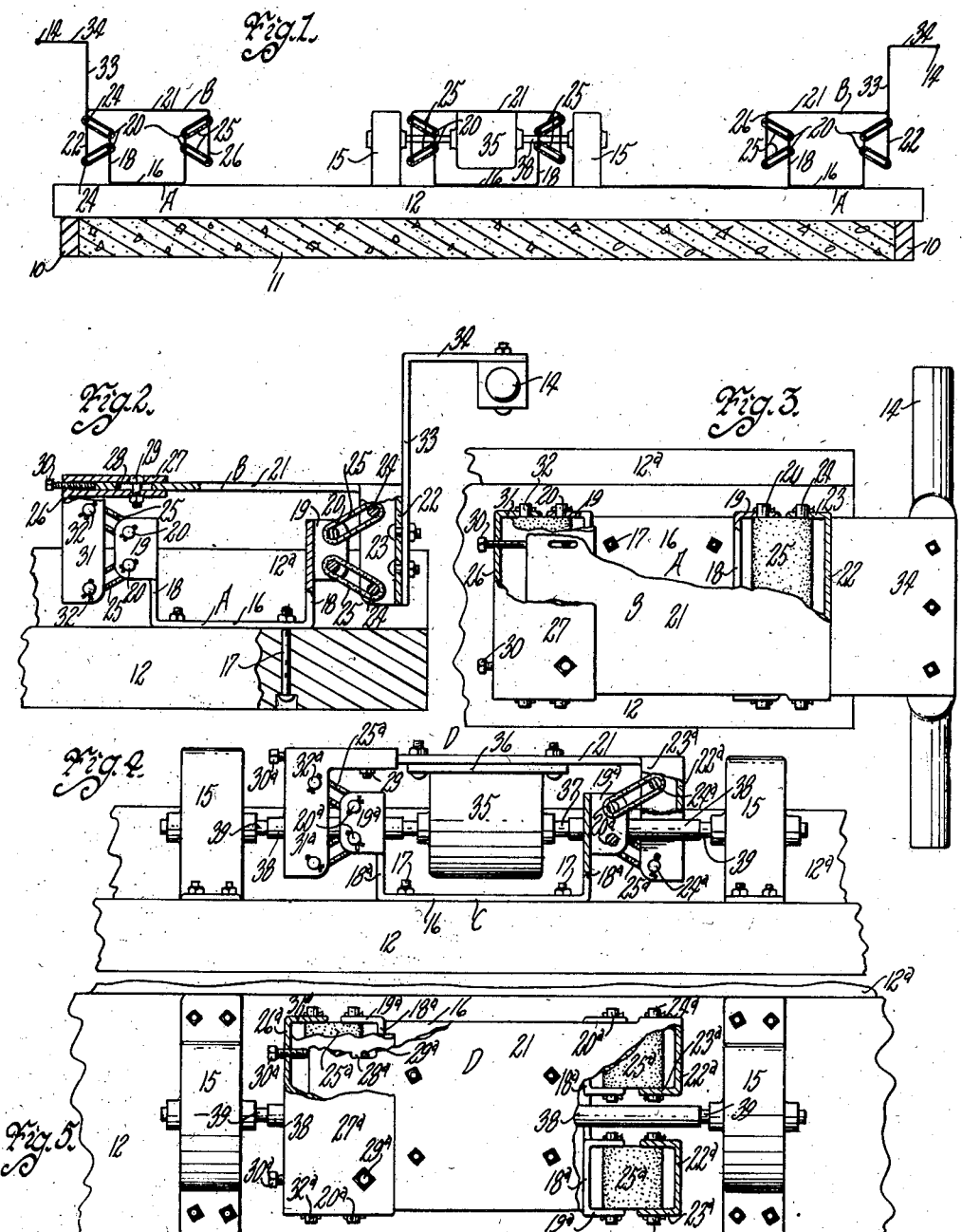

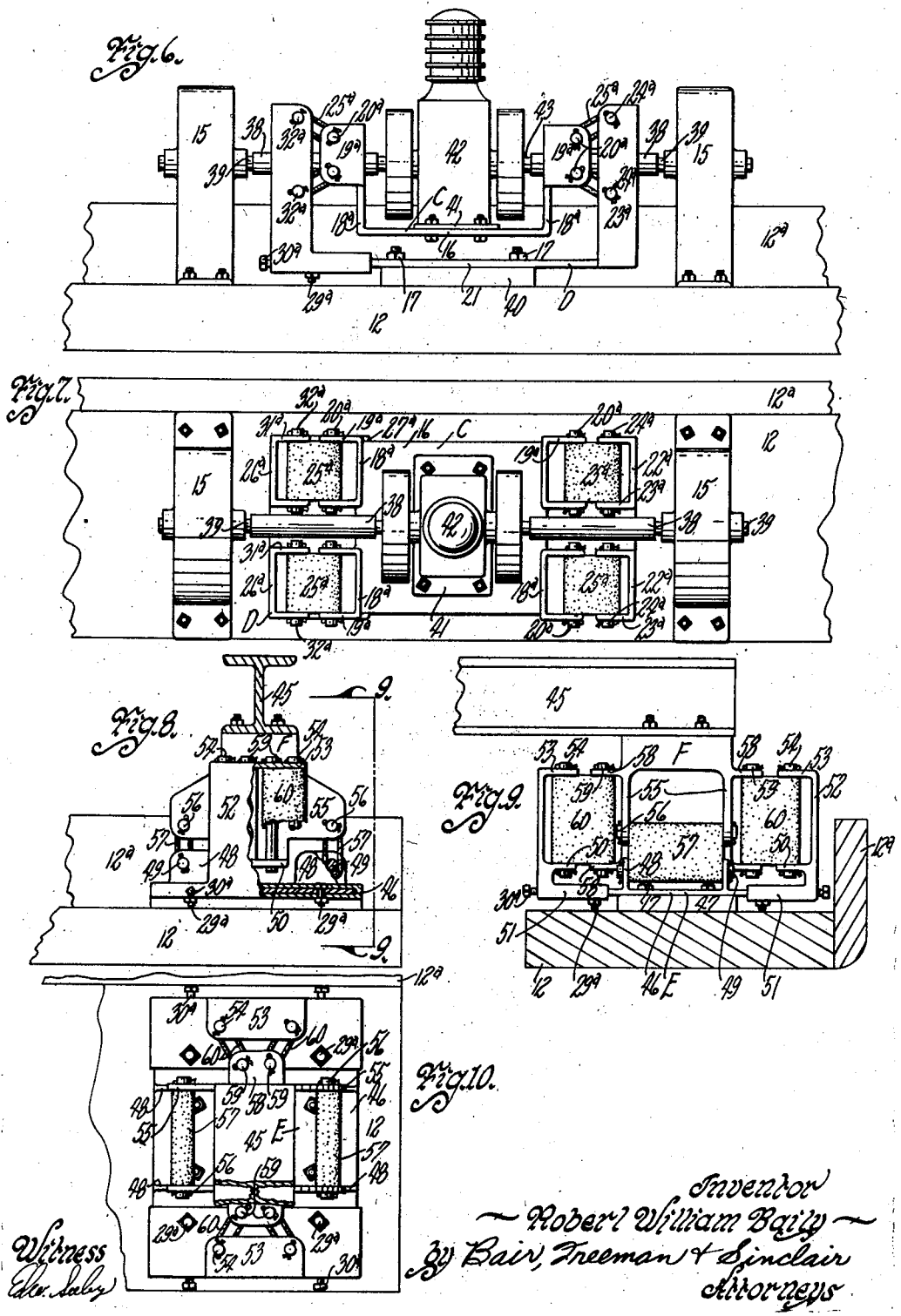

Patented Oct. 22, 1935

2,018,294

UNITED STATES PATENT OFFICE 2,018,294

APPARATUS FOR ELIMINATING THE TRANSMISSION OF VIBRATIONS

Robert William Baily, Philadelphia, Pa.

Application November 23, 1931, Serial No. 576,727
Renewed August 13, 1934

21 Claims. (Cl. 94—48)

The purpose of the present invention is to provide an apparatus for eliminating the transmission of vibrations.

My apparatus is intended primarily for use in association with devices for vibrating plastic masses in pavements or other products.

I have shown for example in my co-pending application, Serial No. 428,747, a screed adapted to be moved over a plastic roadway for striking off the top surface thereof and vibrating the plastic material. Such screeds usually have handles at the end adapted to be grasped by the workmen for manipulating the screeds.

One problem encountered in the use of vibrating mechanisms for such screeds arises from the transmission of the vibration through the handles to the workmen.

On my screed, there is mounted a vibrating apparatus. This must necessarily be associated with some sort of a prime mover. This raises the problem of eliminating the transmission of vibrations from the screed or the vibrating mechanism proper to the prime mover. The vibration of the prime mover itself is highly undesirable for obvious reasons.

Where the vibrated member must be supported at a predetermined elevation or angle, it is essential that the vibrations from the vibrating member be not transmitted in any destructive extent to the supporting member.

I have therefore provided a rather simple and inexpensive apparatus for eliminating vibrations. This apparatus may be readily adapted for use for connecting the handles with a screed or for supporting a prime mover on the screed in such manner that the vibrations of the screed are not transmitted to the handles or the prime mover.

In a mechanism in which the vibrations are produced by one or more out-of-balance weights rotating on a shaft or shafts, the effective direction of the vibrations induced in the casing is in a plane perpendicular to the axis of rotation, and that the effective vibration or movement of the vibrator may be resolved into vector components at right angles to each other; in other words, if the device be viewed from a point in the extended axis of the rotating shaft, the vibrator will have equal and opposite movements left and right, and equal and opposite vertical movements upward and downward. If these vectors be added together in proper sequence they will equal the radial effect or movement of the vibrator.

Where I use tensioned belts or cylindrical loops to dampen vibrations, such belts or loops are usually engaged at either end by pins or rods around which the belts or loops are passed, but in some cases the ends of the belts are clamped with one of their flat surfaces against a rigid or non-elastic member.

If the belts or loops be tensioned so that they are approximately in the same plane, or so arranged that their planes form an acute angle with a plane parallel to and passing between the pins or rods at opposite ends of the system, then the system will easily deflect, first, under loads applied either in directions perpendicular to the flat faces of the belts or, second, in directions transversely of the belts, that is to say edgewise; but in the third condition when the loads are applied in directions parallel to the length of the belts, that is to say, in lines or planes passing from the pins or rods at one end of the system to the pins or rods at the opposite ends of the system, then the belts will present the maximum resistance to distortion, that is, be less able to dampen vibrations.

It therefore follows that to obtain the maximum damping effect against vibration in such a system, the positions of the belts should be such that the directions of the vibrations, if radial, will be in a plane both perpendicular to the faces of the belts as in the first direction above described, and transversely of the belts as in the second direction above described; and conversely the utilization of either the first direction or second direction in combination with the third direction will accomplish but half the desired damping effect, inasmuch as the damping effect will be satisfactory in the first or second directions but not in the third direction.

Where the axis of rotation of the out-of-balance weight is perpendicular to the flat faces of the belts then the vector components of the movements of the vibrator which are transverse of the belts will be satisfactorily damped, but those vector components parallel to the length of the belts, that is having directions passing from the pins or rods in one end of the system toward the pins or rods in the opposite end will be transmitted to the supporting pins or rods in the ends of the belt loops and thence to the handles or supports; likewise, where the axis of rotation is parallel to the supporting pins or rods then the vector components of the movements of the vibrator which are perpendicular to the faces of the belts will be satisfactorily damped, but the vector components parallel to the length of the belt, that is, having directions passing from the pins or rods in one end of the system toward the pins or rods in the opposite ends will be transmitted to the supporting pins or rods in the ends of the belt loops and thence to the handles or supports. In both cases the object of the system is defeated.

In belted devices heretofore utilized in attempting to dampen vibrations where the vibrator is moved by rotative out-of-balance weights, the axis of rotation of the out-of-balance weight, has either, first, been perpendicular to the flat faces of the belt, or second, parallel to the pins carrying the loops at the ends of the belts. In neither arrangement has the desired result been obtained.

In my invention I place the elastic belts relative to the axis of rotation of the revolving out-of-balance weights so that the axis of the revolving out-of-balance weight is approximately parallel to the flat faces of the loops or belts and simultaneously parallel to the length of the belt; in other words the vertical vector components of the vibrator movements will tend to distort the belts or loops in directions perpendicular to their flat faces and the horizontal vector components will tend to distort the belts transversely or edgewise; none of the vector components will tend to pull the belts longitudinally or in directions perpendicular to the axes of the supporting pins or rods. In this manner I obtain the maximum damping benefit against the transmission of vibrations from the vibrator body to the handles or prime mover or support.

It is my object to provide such a device of very simple and inexpensive construction, which can be readily and easily adapted for use in different environments and for different purposes, and which will be effective for accomplishing the desired result.

With these and other objects in view, my invention consists in the construction, arrangement and combination of the various parts of my apparatus for eliminating the transmission of vibrations, whereby the objects contemplated are attained, as hereinafter more fully set forth, pointed out in my claims, and illustrated in the accompanying drawings, in which:

Figure 1 is a front view of a vibrating strike-off screed having handles and a prime mover shown somewhat diagramatically and connected with the screed by means of my apparatus.

Figure 2 is a front view, somewhat enlarged, illustrating the application of my apparatus to the mounting of a handle on a vibrating strike-off screed, parts being broken away and parts being shown in section.

Figure 3 is a top or plan view of the apparatus shown in Figure 2.

Figure 4 is a front elevation of a part of a screed having a prime mover associated therewith by means of my apparatus, parts being broken away and parts being shown in section.

Figure 5 is a top or plan view of the structure shown in Figure 4, parts being broken away and parts being shown in section.

Figure 6 is a front view of another adaptation of my apparatus used for mounting an internal combustion engine as a prime mover.

Figure 7 is a top or plan view of the same.

Figure 8 is a front elevation of a portion of the screed in which a modification of my apparatus is employed for connecting the screed with a pusher bar or supporting member or the like of the type which may be mounted on a large machine or carriage.

Figure 9 is a detailed, sectional view taken on the line 9—9 of Figure 8; and

Figure 10 is a top or plan view of the apparatus shown in Figures 8 and 9, the pusher bar being omitted, parts being broken away and parts being shown in section.

In the drawings herewith, I have illustrated my apparatus associated with a screed of the kind used for striking off and vibrating roadway surfaces. I have used the reference numeral 10 to indicate generally the forms commonly used at the sides of a roadway, which is to be paved.

Between the forms 10 is a slab of plastic material, such for instance as concrete or the like indicated at 11. A vibrating strike-off screed 12 rests upon the forms 10. I have shown the screed in somewhat diagrammatic form. In Figure 9, I have shown it with a special front face 12a.

It is necessary to provide for the screed 12 at the ends thereof, handles 14 to enable the workmen to control the screed.

In the drawings, I have shown the vibrating devices 15, the details of which need not be here referred to. It is desirable, however, that the vibrations imparted to the screed by the vibrating devices 15 should not be transmitted to the handles 14.

I have therefore provided means whereby the handles may be associated with the screed and yet the transmission of vibration to the handles may be substantially eliminated.

Referring now to Figures 2 and 3, it will be seen that I have provided for each handle a U-shaped bracket-like member A, having the horizontal base 16 connected with the screed 12 in any suitable way as by means of the bolts 17. The base 16 extends lengthwise of the screed and has at its ends the upright plate members 18.

The plate members 18 are each provided with a pair of ears 19 extending away from the plates and spaced from each other fore-and-aft. In each pair of ears 19, there is mounted a pair of pins or rods 20. The pins 20 of each pair are preferably vertically spaced as shown.

I provide a second bracket structure, indicated generally at B, comprising a substantially horizontal plate 21, which in the form of the device shown in Figures 1, 2 and 3, stands above the bracket A in the assembled apparatus. The plate 21 has at one end the downwardly extending plate member 22, having the fore-and-aft spaced ears 23. The ears 23 carry the pins 24. The pins 24 carried by the ears 23 are spaced from each other a distance which differs from the distance between the pins 20 carried by the adjacent ears 19. (See Figure 2.)

On the pins 24 are flexible belts 25, which extend respectively around the adjacent pins 20. I preferably use heavy canvas which has sufficient resiliency for the purpose. It is obvious that various connecting means could be used instead of these belts. It would perhaps be better to say that they were resilient than flexible, although the best result requires that the resilience be less than that for instance of rubber belts.

At the opposite end of the plate 21 is an upright plate 26 having at its upper end a socket 27 projecting toward and receiving the free edge of the plate 21. The plate 21 has elongated slots 28. Bolts 29 are mounted in the walls of the socket 27 and extending through the slots 28. Tensioning screw bolts 30 are screwed through the plate 26 with their ends bearing against the free end of the plate 21.

The plate 26 has horizontally spaced ears 31 projecting toward the bracket A. In the ears 31 are mounted the pins 32 vertically spaced the distance different from the distance between the adjacent pair of pins 20. Flexible belts 25, similar to those already referred to, are mounted on the respective pins 32 and the adjacent pins 20 as best shown perhaps in Figure 2.

When the screw bolts 30 are tightened for forcing the plate 21 to the right and the socket 27 to the left (viewing the parts as shown in Figure 2), the belts 25 will be tightened for thus supporting the upper bracket B in position.

Secured to the plate 22 is an upright plate 33 having at its upper end a right-angled extension 34 to which the handle 14 is secured in any suitable way.

I find that by the use of an apparatus of the kind herein described, the transmission of vibrations from the screed 12 to the handle 14 may be substantially eliminated.

In Figures 4 and 5, I have shown my apparatus such as has been already described with modifications hereafter referred to, adapted for supporting an electric motor or prime mover upon the screed 12.

The parts of the apparatus are the same as those already described, except the plates 33 and 34 and the handles 14 are omitted and the plates 18, 22 and 26 have a modified arrangement of ears, and there are four belts instead of two.

The motor 35 is provided with a supporting flange 36, which is bolted to the plate 21 of the bracket B. The motor shaft 37 projects from both ends of the motor case and is connected by flexible shafts 38 with the shafts 39 of the vibrating devices. It being necessary to make allowance for these shafts, it will be noted that instead of each plate 18, there is a plate 18a, which has horizontally spaced pairs of ears 19a to allow a space between the front and rear pair for the shaft 38. Similarly instead of the plate 22, there is a plate 22a, which has fore-and-aft spaced pairs of ears 23a. Instead of the plate 26, there is a plate 26a, which has horizontally spaced pairs of ears 31a. This makes necessary the four narrower belts 25a instead of the belts 25.

Thus the motor 35 is supported on the screed by vibration eliminating apparatus in such manner that rotation of the motor shaft 37 may be imparted to the vibrator shafts 39 directly through the shafts 38 and yet the motor is largely relieved of vibration imparted from the vibrating devices 15.

In Figures 4 and 5, I have used the reference characters C and D to indicate generally the lower and upper brackets.

In Figures 6 and 7, I have shown a different arrangement of my apparatus using the form shown in Figures 4 and 5. In the adaptation shown in Figures 6 and 7, the bracket D is inverted and a filler block is interposed between the plate 21 and the screed 12, so as to allow for the projecting ends of the bolts 29. The bracket C is then hung as shown in Figure 6 by means of the belts 25a, and the base 41 of an internal combustion engine 42 is bolted to the plate 16.

The engine 42 has a shaft 43 projecting in both directions from the crank case and connected to the flexible shafts 38, which have already been described.

The structure shown in Figures 6 and 7 simply illustrates how readily my apparatus may be adapted for use with an internal combustion engine.

Now referring to Figures 1, 2, 3, 4, 5, 6, and 7, it will be noted that the axes of the driving shafts 38 and 39 of the vibrators 15 are approximately parallel to or at acute angles with the flat faces of the elastic belts 25 and 25a, and also are parallel to or at acute angles with planes passing through the axes of supporting pins or rods 20 and 24 of each belt or loop 25. If the vibrator 15 be actuated by rotating out-of-balance weights mounted on shafts 38 and 39, then the movements of the vibrators or their vector components will be parallel to planes that are perpendicular to the shafts 38 and 39. The plate 10 members 18 will obviously move in directions similar to those of the vibrators 15. Referring now to Figure 1, it will be seen that the rods or pins 20 will move vertically, tending to distort the belts 25 in directions principally perpendicular to their faces, and the rods or pins 20 will also move in directions parallel to their axis, thereby tending to distort the belts 25 laterally, that is, edgewise, and there will be very little tendency to force the pins 20 and 24 to approach toward or recede from each other in a manner to distort the belts longitudinally; in other words, a plane parallel to the movement of the vibrators is parallel to the belt pins 20 and 24, and is approximately perpendicular to a plane which bisects the angles between the planes of the flat faces of the belts 25 at opposite ends of the brackets 16 and 21. By this arrangement of the belts relative to the direction of vibration I obtain the maximum benefits of the elastic properties of the belts and therefore transmit to the members 21, the minimum possible vibration. The same argument applies to the arrangement shown in Figures 2, 3, 4, 5, 6 and 7.

It will be noted in Figures 1 to 7 inclusive, that the positions of vibrators 15 are such that their shafts are parallel to the longitudinal dimension of the screed, and if the shafts 38 and 39 are provided with out-of-balance rotative weights then the screed 12 will vibrate in directions parallel to a vertical plane which is perpendicular to the longitudinal dimension of the screed 12.

Referring now to Figure 9 which is a sectional end view of the screed 12, on the line 9—9 of Figure 8, it is obvious that the screed 12 will have vibratory motions in horizontal directions left and right and in vertical directions up and down also. Considering the horizontal movements imparted to pins 59, it will be seen that the belts 60 will be distorted in lateral directions or edgewise; and it will be obvious that I will thus obtain the maximum damping benefit against the transmission of vibrations from the screed 12 to the pusher or supporting member 45. It will also be seen that the position of the screed 12 can be determined and controlled through the medium of the belts 60 by the pusher or supporting bar 45.

In Figures 8, 9 and 10, I have shown another modification of my apparatus. It is sometimes desirable to carry the screed on a large machine. Such a machine may have the large heavy parallel pusher bars 45, having perhaps the form of I-beams spaced apart laterally and extending substantially parallel to the forms, which may in such case be in the form of rails for the large machine.

In the form of my apparatus shown in Figures 8, 9 and 10, I provide a base plate 46 supported on a filler block 47 on the screed 12 crosswise thereof. The base plate has fore-and-aft spaced upwardly extending ears 48, spaced from each other crosswise of the screed and having mounted in them fore-and-aft spaced pins or rods 49.

Two pairs of these ears 48 are spaced from each other lengthwise of the screed.

The opposite ends of the plate 46 are received in sockets 51 similar to the sockets 27 already described. The plate 46 and sockets 51 are connected with each other in the same way as is the plate 21 with the sockets 27. Tensioning screw bolts are illustrated at 30a.

At the outer end of each socket is an upwardly projecting plate 52, having vertically spaced horizontal ears 53, projecting inwardly as shown in Figure 9. Each vertically spaced pair of ears 53 has mounted in it a pair of vertical pins 54, spaced from each other lengthwise of the screed.

The plate 46 and the sockets and plates 52 may be generally designated as the bracket E.

Bolted to the under side of each pusher bar 45 is a bracket F having the downwardly extending ears 55 spaced from each other crosswise of the screed. Supported by the ears 55 is a pair of pins 56 spaced from each other lengthwise of the screed and arranged preferably substantially directly above the respective pins 49.

A resilient belt of canvas or the like 57 is mounted on each pin 56 and the next lower pin 49 somewhat loosely. The purpose of these belts 57 is to support the screed and take the strain off the other belts hereafter to be described when the screed is lifted by the operation of the machine in raising the pusher bars 45.

Each ear 55 has a pair of vertically spaced ears 58 projecting away from it. Each vertically spaced pair of ears 58 has mounted in it a pair of pins 59, spaced from each other lengthwise of the screed. A somewhat resilient belt 60 is mounted on each pin 59 and on an adjacent pin 54, as shown in Figures 9 and 10. As illustrated, the pins 59 and 54 are so located that the belts 60 are inclined from the pins 59 away from each other (see Figure 10).

The device as shown in Figures 8, 9 and 10 may be used with a large machine having the pusher bars 45, by which the screed is advanced and by which it may be raised or lowered. When the screed rests on the forms at the sides of the roadway, the belts 57 are so loose that they perform practically no function and the vibration is eliminated by means of the belts 60. If, however, it is desirable to raise the pusher bars 45 and thus lift the screed, the belts 57 will function to take some of the strain off the belts 60.

It is obvious from the foregoing that an apparatus of this kind for eliminating vibration may be readily modified and adapted for use in different environments.

While I have illustrated my apparatus as associated with a vibrating screed, I do not desire to limit myself to such a use. Numerous changes may be made in the details of the construction and arrangement of my apparatus for eliminating vibration, and it is my purpose to cover by my claims any modified forms of structure or use of mechanical equivalents, which may be reasonably included within their scope.

I claim as my invention:

1. In a device of the kind described, a bracket having belt supporting means at its opposite sides, a second bracket having spaced vertical portions on opposite sides of the first bracket provided with belt supporting means, belts on opposite sides of the first bracket, connecting belt supporting means thereon with belt supporting means on the second bracket, said belts being arranged in pairs diverging with respect to the second bracket, the belt supporting means of one bracket being relatively adjustable for tensioning the belts.

2. An apparatus for eliminating vibration and adapted to be interposed between a vibrating device and another device, comprising a bracket having spaced substantially vertical portions at its ends, a second bracket having spaced substantially vertical portions spaced horizontally from the respective first portions, diverging flexible belts connecting the respective vertical portions of one bracket, with the respective vertical portions of the other bracket, the portions of one bracket being adjustable toward and from each other for tensioning the belts.

3. In a device of the kind described, a bracket having belt supporting means at its opposite sides, a second bracket having spaced vertical portions on opposite sides of the first bracket provided with belt supporting means, belts on opposite sides of the first bracket, connecting belt supporting means thereon with belt supporting means on the second bracket, said belts being arranged in diverging pairs, the belt supporting means of one bracket being relatively adjustable for tensioning the belts, and spaced vertical belts connecting the respective brackets.

4. In a device of the class described, a bracket having spaced substantially parallel members adapted to support flexible belts, a second bracket having spaced parallel members adapted to receive flexible belts, belts mounted respectively on the members of the respective brackets, the belts being inclined away from each other from the first bracket to the other bracket, one of said brackets having adjustable means for varying the position of a belt supporting means thereon for thus tensioning the belts.

5. In a device of the class described, a bracket having spaced substantially parallel members adapted to support flexible belts, a second bracket having spaced parallel members adapted to receive flexible belts, belts mounted respectively on the members of the respective brackets, the belts being inclined away from each other from one bracket to the other, the bracket having the diverging ends of the belts being provided with adjustable means for varying the relative positions of its belt holding means for thus regulating the tension of the belts.

6. In an apparatus of the kind described, the combination of a member vibrating in a vertical plane in a circular or closed curved path, and a handle therefor, with an apparatus for preventing the transmission of vibration, comprising one or more systems each consisting of a bracket fixed to said vibrating member and having spaced and parallel pairs of pins, the members of each pair being spaced parallel and apart, a belt on each pin of the first bracket, and extending around a pin on the second bracket, said belts being arranged in pairs inclined away from each other from one bracket to the other, said apparatus having means for tensioning the belts, said second bracket being operatively connected with the handle, said first bracket being operatively connected with the vibrating member, said vibrating member so disposed relative to the positions of the belts that its plane of vibration is simultaneously parallel to the said belt pins, and approximately perpendicular to a plane which bisects the angles between the planes of the flat faces of the said pairs of belts at opposite ends of the brackets.

7. In a structure of the kind described, the combination of a member vibrating in a vertical plane in a circular or closed curved path and a pusher and supporting member with an apparatus for preventing the transmission of vibrations, comprising one or more systems each consisting of a pair of brackets, one secured to the vibrating member and one to the pusher or supporting member, each bracket having at each end a spaced pair of pins, a resilient belt connecting each pin of each bracket with a pin of the other bracket, said belts being arranged in pairs inclined away from each other from one bracket to the other, said apparatus having means for tensioning said belts, said brackets respectively having parallel pins, the pins of one bracket being spaced apart from and parallel to the pins of the other bracket, said vibrating member being so disposed relative to the positions of the belts that its plane of vibration is simultaneously parallel to the said belt pins and approximately perpendicular to a plane which bisects the angles between the planes of the flat faces of the said pairs of belts at opposite ends of the brackets.

8. In a structure of the kind described, the combination of a member vibrating in a vertical plane in a circular or closed curved path, and a pusher and supporting member with an apparatus for preventing the transmission of vibrations, comprising one or more systems each consisting of a pair of brackets, one secured to the vibrating member and one to the pusher or supporting member, each bracket having at each end a spaced pair of pins, a resilient belt connecting each pin of each bracket with a pin of the other bracket, said belts being arranged in pairs inclined away from each other from one bracket to the other, said apparatus having means for tensioning said belts, said brackets respectively having parallel pins, the pins of one bracket being spaced apart from and parallel to the pins of the other bracket, said vibrating member being so disposed relative to the positions of the belts that its plane of vibration is simultaneously parallel to the said belt pins and approximately perpendicular to a plane which bisects the angles between the planes of the flat faces of the said pairs of belts at opposite ends of the brackets, and means for determining the position of the vibrating member by determining the position of the pusher or supporting member.

9. In a structure of the kind described, the combination of a member vibrating in a vertical plane in a circular or closed curved path, and a pusher and supporting member with an apparatus for preventing the transmission of vibrations, comprising one or more systems each consisting of a pair of brackets, one secured to the vibrating member and one to the pusher or supporting member, each bracket having at each end a spaced pair of pins, a resilient belt connecting each pin of each bracket with a pin of the other bracket, said belts being arranged in pairs inclined away from each other from one bracket to the other, said apparatus having means for tensioning said belts, said brackets respectively having parallel pins, the pins of one bracket being spaced apart from and parallel to the pins of the other bracket, said vibrating member being so disposed relative to the positions of the belts that its plane of vibration is simultaneously parallel to the said belt pins and approximately perpendicular to a plane which bisects the angles between the planes of the flat faces of said pairs of belts at opposite ends of the brackets, in a combination with a pin or a parallel pair of pins on one bracket, the said pin or pins lying in a plane or planes approximately perpendicular to the axes of the pins carrying the tensioned belts, and a pin or a parallel pair of pins on the other bracket, a belt or belts loosely connecting the pin or pins of one bracket with the pin or pins of the other bracket.

10. In a structure of the kind described, the combination of a member vibrating in a vertical plane in a circular or closed curved path, and a pusher and supporting member with an apparatus for preventing the transmission of vibrations, comprising one or more systems each consisting of a pair of brackets, one secured to the vibrating member and one to the pusher or supporting member each bracket having at each end a spaced pair of pins, a resilient belt connecting each pin or each bracket with a pin of the other bracket, said belts being arranged in pairs inclined away from each other from one bracket to the other, said apparatus having means for tensioning said belts, said brackets respectively having parallel pins, the pins of one bracket being spaced apart from and parallel to the pins of the other bracket, said vibrating member being so disposed relative to the positions of the belts that its plane of vibration is simultaneously parallel to the said belt pins and approximately perpendicular to a plane which bisects the angles between the planes of the flat faces of said pairs of belts at opposite ends of the brackets, in a combination with a pin or a parallel pair of pins in one bracket, the said pin or pins lying in a plane or planes approximately perpendicular to the axes of the pins carrying the tensioned belts, and a pin or a parallel pair of pins on the other bracket, a belt or belts loosely connecting the pin or pins of one bracket with the pin or pins of the other bracket, and means for determining the position of the vibrating member by determining the position of the pusher or supporting member.

11. In an apparatus of the kind described, the combination of a member adapted to be vibrated for vibrating material beneath it, a vibrating device associated with said member for imparting vibrations thereto and including an out-of-balance element rotating upon an axis, spaced arms on opposite sides of the vibrating element in planes substantially parallel with the plane of rotation of the vibrating element, means fixed with relation to said member, for connecting the arms, and tensioned belts interposed between the vibrating device and the arms, in planes having such angular relation to the plane of rotation of the element, that the vibrations are imposed across the belts and not lengthwise thereof.

12. In an apparatus of the kind described, the combination of a member adapted to be vibrated, a vibrating device associated with said member for imparting vibrations thereto and including an out-of-balance element rotating upon an axis, a second member spaced from the vibrating device in a plane substantially parallel with that of the rotation of the vibrating element, and a tensioned belt interposed between the device and the second member, in a plane at such an angle to the above-mentioned planes, that the vibrations are imposed across the belts and not lengthwise thereof, so as to secure maximum damping of vibrations between the vibrating device and the second member.

13. In an apparatus of the kind described, the combination of a member adapted to be vibrated, for imparting vibrations to a plastic material upon which the member is superimposed, a vibrating device associated with said member for imparting vibrations thereto, a weight element supported on the member and means interposed between the element and the member for imposing pressure from the weight element upon the member and for damping the transmission of vibrations from the member to the element.

14. In an apparatus of the kind described, the combination of a member adapted to be vibrated, for imparting vibrations to a plastic material upon which the member is superimposed, a plurality of vibrating devices associated with said member for imparting vibrations thereto, the shafts of said vibrators being approximately parallel to and in line each with the other, means for rotating said shafts, flexible connections interposed between said vibrating devices, a weight element and means interposed between the element and the member for imposing pressure from the weight element upon the member and for damping the transmission of vibrations from the member to the element.

15. In an apparatus of the kind described, the combination of a member adapted to be vibrated, for imparting vibrations to a plastic material upon which the member is superimposed, a plurality of vibrating devices associated with said member for imparting vibrations thereto, the shafts of said vibrating devices being approximately parallel to each other and to the bottom and front faces of the member, a weight element and means interposed between the element and the member for imposing pressure from the weight element upon the member and for damping the transmission of vibrations from the member to the element.

16. In an apparatus of the kind described, the combination of a member adapted to be vibrated, for imparting vibrations to a plastic material upon which the member is superimposed, a plurality of vibrating devices associated with said member for imparting vibrations thereto, the shafts of said vibrating devices being approximately parallel to each other and to the bottom and front faces of the member, a weight element, a prime mover supported by the member, and means interposed between the prime mover and the element and the member for damping the transmission of vibrations from the member to the prime mover.

17. In an apparatus of the kind described, the combination of a member adapted to be vibrated, for imparting vibrations to a plastic material upon which the member is superimposed, a plurality of vibrating devices associated with said member for imparting vibrations thereto, a prime mover carried by the member, means interposed between the member and the prime mover for damping the transmission of vibrations from the member to the prime mover, and flexible means for transmitting power from the prime mover to the vibrating devices.

18. In an apparatus of the kind described, the combination of a member adapted to be vibrated, for imparting vibrations to a plastic material upon which the member is superimposed, the member adapted to be reciprocated across the material as the member advances over the material, a plurality of vibrating devices associated with said member for imparting vibrations thereto, a prime mover carried by the member, means interposed between the member and the prime mover for damping the transmission of vibrations from the member to the prime mover, and flexible means for transmitting power from the prime mover to the vibrating devices.

19. In an apparatus of the kind described, the combination of a member adapted to be vibrated, for imparting vibrations to a plastic material upon which the member is superimposed, a vibrating device associated with said member for imparting vibrations thereto, a prime mover carried by the member and means interposed between the element and the prime mover upon the member and for damping the transmission of vibrations from the member to the element, and flexible means for transmitting power from the prime mover to the vibrating device.

20. A compacting apparatus comprising a base, a motor driven inertia weight of substantial mass movably mounted upon said base to be thrust upwardly and downwardly thereby to cause compacting impulses of the base, and a floating load of substantial weight suspended in resilient relation above the base whereby to impose continuously its weight as a supplemental gravity load upon the base without substantial resistance to the vibration of the base.

21. In an apparatus of the kind described, a member adapted to be vibrated for imparting vibrations to material upon which the member is superimposed, a vibrating device carried by the member, a weight, and vibration damping means for supporting the weight on the member and for damping up and down vibrations between the member and weight.

ROBERT WILLIAM BAILY.